United States Patent
Wickström

[11] Patent Number: 6,111,905
[45] Date of Patent: Aug. 29, 2000

[54] METHOD AND DEVICE FOR PURIFYING GAS

[75] Inventor: Stellan Wickström, Mölndal, Sweden

[73] Assignee: SAAB Dynamics Aktiebolag, Linkoping, Sweden

[21] Appl. No.: 09/180,779
[22] PCT Filed: May 14, 1997
[86] PCT No.: PCT/SE97/00791
 § 371 Date: Nov. 30, 1998
 § 102(e) Date: Nov. 30, 1998
[87] PCT Pub. No.: WO97/43808
 PCT Pub. Date: Nov. 20, 1997

[30] Foreign Application Priority Data

May 15, 1996 [SE] Sweden .................................. 9601881

[51] Int. Cl.[7] ..................................................... H01S 3/22
[52] U.S. Cl. ..................... 372/59; 372/3; 372/98
[58] Field of Search .................... 372/59, 92, 98, 372/3

[56] References Cited

U.S. PATENT DOCUMENTS 4,723,254  2/1988  Turner ........................................ 372/59

FOREIGN PATENT DOCUMENTS 0 408 974 A2  1/1991  European Pat. Off. .

Primary Examiner—Leon Scott, Jr.
Attorney, Agent, or Firm—Pollock Vande Sande & Amernick, R.L.L.P.

[57] ABSTRACT

The present invention relates to a method and a device for purifying methane gas in a Raman cell (20). When pumped laser light having a high power passes through the Raman cell containing methane gas, a portion of the methane can be decomposed, and then highly reactive methyl radicals are formed. They can react with each other and as time passes form organic compounds, which are deposited on the inner side of the windows (22a, 22b) of the Raman cell. A trap (26) comprising calcium grains (27), which absorb the methyl radicals, is introduced in the Raman cell (20). The methane gas, which comprises a small content of methyl radicals, is made to come in contact with the calcium grains (27), whereby a reaction occurs between the methyl radicals and the calcium grains, so that calcium carbide and calcium hydride are formed. The methane gas is driven around in the Raman cell (20) and through the trap (26) by means of a compressor wheel (28) driven by a motor (29c).

27 Claims, 5 Drawing Sheets

METHOD AND DEVICE FOR PURIFYING GAS

TECHNICAL FIELD

The present invention relates to a method of purifying gas in a Raman cell. More particularly, it is related to a method of purifying methane gas in a Raman cell by making the gas pass through an absorber. The invention also relates to a Raman cell that includes an absorber.

STATE OF THE ART

In some laser applications it can be desirable to change the frequency of the laser light. One example is when making distance measurements by means of laser where it is desirable to use laser light having such a frequency that is not harmful to the human eye. For this application also a high pulse power and a good transmission in the atmosphere are required. Laser light having wavelengths around 1.5 $\mu$m have proved to fulfil these requirements.

Raman cells are often used for shifting the frequency of laser light. A Raman cell contains a gaseous Raman active medium. A pumped laser emits short laser pulses, so called laser shots, having a high output power, which are focused by means of a lens system to the center of the Raman cell. Owing to the resulting strong electromagnetic field the electron states of the gas molecules are excited from an initial level to a virtual energy level. Returns thereafter occur to a final level having a higher energy than the initial level, whereby laser light having a longer wavelength than the wavelength of the pumped laser is emitted. The difference between the pumped laser wavelength and the emitted shifted wavelength is called a Raman shift. The obtained Raman shifted wavelength depends on the Raman medium used and the pumped laser used. Hydrogen gas and methane gas are examples of gases having Raman shifts.

In order to obtain the above desired wavelength that is secure to the eyes and is about 1.5 $\mu$m, for the pumped laser a Nd:YAG laser can be used combined with a Raman cell filled with methane gas. The wavelength after passing the pumped laser beam that has a wavelength of 1.064 $\mu$m through the methane gas is then 1.542 $\mu$m. Raman cells filled with methane gas are also used in other applications than that described above and can also be used combined with other pumped laser sources which then result in different wavelengths. The use of methane gas as the Raman medium has many advantages. Methane gas has a large cross-section for scattering, a good amplification, is a stabile compound and has ample supply.

In order that the Raman process that results in the frequency shift will have a good efficiency, the beam of the pumped laser must be focused in the cell, whereby the intensity of the beam in the center of the cell will be very high. When the pumped laser beam is focused in the methane gas such a high field strength is obtained that the probability of the methane molecule being broken cannot be neglected. The process which then takes place is that a hydrogen atom is torn away from the methane molecule whereby methyl radicals and hydrogen gas are obtained according to the following:

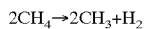

The methyl radicals which are formed in the initial stage of the process according to the above are extremely reactive and can react with each other so that long chains of hydrocarbon are formed. By other processes like plasma-induced polymerization organic products are formed which by the laser radiation are burnt to stick to the inner side of the input and output windows of the Raman cell, exactly at those places where the laser beam passes. This process is developed slowly and degrades the cell at the rate of the number of laser shots. Depositions of this kind on Raman windows is a known problem and different solutions to this problem have previously been proposed.

From the U.S. Pat. No. 4,751,714 a Raman cell is proposed in which hydrogen gas is supplied to the methane gas in such a quantity that a balance between the decomposition of methane gas and the creation of methane gas is set according to the following:

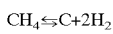

By maintaining this balance deposition of carbon is prevented at the surface of the Raman window. The disadvantage of this method is that the depositions do not contain pure carbon but long chains of hydrocarbon which are formed by another process as has been described above. This method prevents depositions of pure carbon but does not affect the production of other organic compounds.

From the U.S. Pat. No. 5,048,042 and the patent application EP 0 408 974 catalytic methods are previously known for preventing depositions to be formed in Raman cells filled with methane.

In U.S. Pat. No. 5,048,042 palladium is used on a titanium substrate as a catalyst, and when the methane gas comes in contact with the catalyst a hydration is produced of the methyl radicals which have been formed in the decomposition of methane. Thereby the forming of depositions is prevented.

In EP 0 408 974 homogenous catalysis is combined with heterogenous catalysis. The heterogenous catalyst is preferably a noble metal, e.g. palladium, and the homogenous catalyst can be palladium mixed with some metal, e.g. manganese. As a carrier of the catalysts e.g. aluminum oxide can be used.

The disadvantage of the aforementioned catalytic methods is, that besides capturing the gas, a synthesis of the products formed therein to their original states or to harmless products is required.

From the U.S. Pat. No. 4,723,254 a method is previously known for purifying inert gases in a excimer laser system. Owing to the lasing impurities are formed in the gas and because it is costly to change the gas it is desirable to purify and reuse the gas. The gas is from the laser conducted to a tube that comprises a trap filled with heated calcium particles. When the inert gas passes the calcium particles a diffusion of halogens takes place in the gas. The diffusion increases with increased temperature and thus the trap should be heated to 500–700° C. The disadvantage of the method is that at such high temperatures calcium vapour is formed which then condenses and this can result in calcium plugs in the tube. By constructing the trap to have alternatingly layers of calcium particles and steel wool this phenomenon is to be prevented. The disadvantage thereof is that the construction of the trap then will be complicated and that the process must be performed at a high temperature.

The construction of Raman cells is known in the art. The principle of a Raman cell is that it consists of a cavity filled with gas and having input and output windows which are transparent to the radiation from the laser and to the Raman shifted radiation. In order to allow high repeater frequencies of a Raman laser system it is necessary to circulate the gas in the cell. In the case where no gas rotation exists the gas in the center of the cell will be heated by the laser beam. The heating of the gas results in that the optical characteristics of the gas are changed so that it will be difficult or impossible to focus the pump light sufficiently sharp, the so called thermal lens effect. This results in that the Raman process stops.

There are a multitude of known ways of rotating the gas in a Raman cell. In the aforementioned patent application EP 0 408 974 several different designs of a Raman cell are described in which the gas is rotated. The gas can be made to move by using some driving device such as a compressor wheel or a vibrating blade.

DESCRIPTION OF THE INVENTION

The present invention attacks a problem of how to prevent the formation of depositions on the inner side of the windows of a Raman cell filled with methane gas.

Another problem is how the Raman cell is to be designed in order to produce the effect desired by the invention.

An object of the present invention is thus to increase the lifetime of a Raman cell by preventing the formation of depositions on the inner side of the windows thereof at the same time as the disadvantages of previously known methods for solving this problem can be avoided.

The above problem is solved by making the methane gas in the Raman cell pass through an absorbing material, so that highly reactive groups which are formed in the decomposition of methane molecules react with the absorbing material.

More particularly, the problems are solved by introducing in the Raman cell an absorbing material from one of the groups of alkali metals or alkaline-earth metals. The methane gas is made to contact the absorbing material, the methyl radicals then being absorbed by the trap by reacting with the absorbing material. This prevents the production of organic material which can be deposited on the windows of the Raman cell. The absorbing material can have a granular shape which gives a large absorption area and be enclosed in a perforated container which is permeable to the gas but impermeable to the absorbing material.

An advantage of the invention is that the formation of heavier hydrogen molecules which by plasma-induced polymerization can form organic compounds which are burnt to stick to the inner side of the input and output windows of the Raman cell is prevented. It results in that the lifetime of the Raman cell is increased and the performance thereof is improved.

Another advantage is that the absorption of methyl radicals is made at a low temperature and that the gas in the Raman cell is made to circulate. This helps to maintain a low temperature in the Raman cell so that the Raman process is kept going.

Still another advantage is that the trap can easily be designed and can easily be placed in the Raman cell and thus the method is cost-efficient.

The invention will now be described in greater detail by way of preferred embodiments with reference to the accompanying drawings.

DESCRIPTION OF TEE DRAWINGS

PREFERRED EMBODIMENTS

Figure 1:
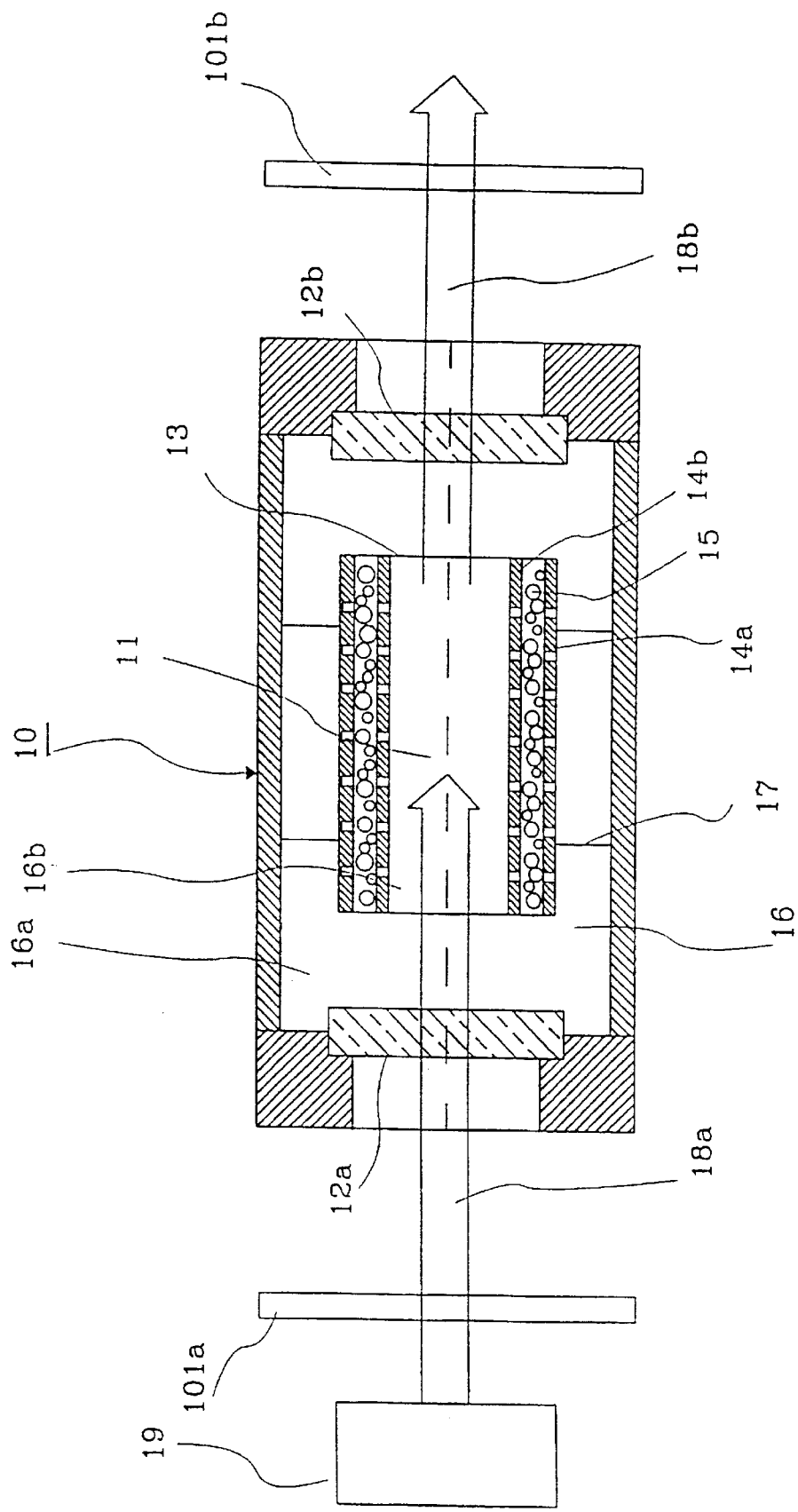
FIG. 1 shows in a cross-sectional view an embodiment of a Raman cell according to the invention.

The construction of a Raman cell is well-known to one skilled in the art. A Raman cell includes a cavity that extends between an input window and an output window. The windows are transparent to the desired wavelengths from an incoming, pumped beam from a pumped laser, and to the shifted laser light travelling out from the Raman cell. The cavity is filled with a gaseous, Raman active medium which in the present invention comprises methane. The portion of the cavity through which the pumped laser beam passes is called the interaction centre. The Raman cell is placed in a resonator and thus the Raman cell can be considered as an optically pumped laser.

As has been mentioned earlier, a portion of the methane molecules are decomposed to highly reactive methyl radicals and hydrogen gas when they are exposed to the highly intensive irradiation from the pumped laser. In order to purify the methane gas from the methyl radicals the gas in the Raman cell is according to the invention made to contact an absorbing material which has a large reaction cross-section for the reaction with methyl, i.e. the probability of this reaction is high. Then the methyl radicals react with the absorbing material whereby solid, stabile compounds are formed. Materials which have a high reaction cross-section for methyl are found among the alkaline-earth metals, e.g. calcium, barium and strontium, and the alkali metals, e.g. lithium and potassium. These substances react with methyl in similar ways. Since the methyl radicals are highly reactive it is not necessary to heat the absorbing material above the ambient temperature. The operative temperature of the Raman cell is in the interval of $-40°$ C.$-+65°$ C.

The invention will hereinafter be described as various embodiments in which the absorbing material is calcium. In a contact between the methane gas including the generated methyl radicals and calcium, the methyl radicals react with the calcium and are absorbed. The reaction probability of calcium with methyl groups is very high. Then the solid and stabile compounds calcium hydride and calcium carbide are formed according to the following reaction formula:

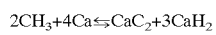

The methane gas is thereby purified from the highly reactive methyl groups.

The invention is not limited to only the use of calcium as an absorber. Other alkaline-earth metals such as barium and strontium have a very high reaction probability for methyl groups. These substances react in a similar way as calcium, and then barium carbide and barium hydride are formed in a reaction between methyl and barium and strontium carbide and strontium hydride are formed in a reaction with strontium.

Also alkali metals, such as lithium and potassium, are well suited as absorbing materials for the method according to the invention. Lithium is a very stabile substance at ambient temperature which under an atmosphere of a protective gas can be machined to a suitable shape and thus is a good absorption material that can easily be handled. In a possible reaction between methyl radicals and lithium lithium carbide and lithium hydride are formed according to the following:

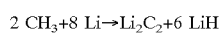

In the examples given hereinafter the absorbing material is granular calcium. The granular shape gives a large reaction area to the calcium and a permeability for the methane gas between the granules.

In a very simple embodiment the calcium granules can be placed on the bottom of the cavity of a Raman cell. However, it is more advantageous to place the granules in some sort of container which is permeable to the gas, a so called trap, the container being attached in the Raman cell so that a large portion of the gas can pass through the container. An embodiment of a Raman cell according to the invention is shown in FIG. 1. The calcium granules are here enclosed in an absorption trap in the shape of a container 13 which is permeable to the gas 16a but impermeable to the calcium granules 15. The container 13 has the shape of a hollow cylinder having a perforated outer wall 14a and a perforated inner wall 14b. The space between the outer and inner walls is filled with calcium granules 15.

The container 13 is placed in the cavity 16 of the Raman cell centrally around the interaction center 11 thereof. The container 13 is attached to the inner wall of the cavity 16 by means of supports 17. The Raman cell 10 has an input window 12a for a pumped laser beam 18a from a schematically shown pumped laser 19. The cell 10 has also an output window 12b through which Raman shifted light 18b leaves the cell 10. It is the inner sides of the windows 12a and 12b which are exposed to the risk of being deposited with the aforementioned organic products if the content of methyl radicals 16b is allowed to increase in the cavity 16.

When the gas 16a including the methyl radicals 16b is exposed to the highly intensive laser radiation 18a it is heated as has been mentioned above. Some movement of the gas is formed owing to autoconvection and the gas 16a is in that way made to come in contact with the calcium granules 15. The Raman cell 10 is placed between first and second semi-transparent mirrors 101a and 101b. Thereby, lasing of the light 18b shifted in the Raman cell 10 takes place and thus also the Raman cell 10 is to be considered as an optically pumped laser.

As has been mentioned above it is advantageous to circulate the gas in the Raman cell since the Raman process otherwise stops owing to a thermal lens effect. The circulation of the gas in the Raman cell also results in a higher effect of the gas purification according to the invention. Since the gas has to be made to come in contact with the absorbing material in order that a reaction will take place between the methyl radicals and the absorbing material it is naturally advantageous to circulate the gas through the absorption trap, whereby the largest possible portion of the gas volume is made to come in contact with the absorbing material.

A movement of the gas can be obtained by introducing a driving device in the cavity of the Raman cell. Such a driving device can be a compressor wheel. The cavity can be designed to include at least one gas channel through which the gas is made to move. The gas can then be driven in a definite direction and a laminar gas flow is obtained. Another way of bringing the gas to move is to introduce a vibrating blade. It can be driven piezoelectrically. The gas is in that way moved in the cavity. Another way of moving the gas is to introduce a rotatable, cylinder-like device having radial wings including separate pockets located therebetween. The gas volume is in that way divided by the different pockets. The laser beam is focused in one pocket and after each laser pulse the cylinder is rotated, so that the gas volume in a new pocket is irradiated. The gas volume in a pocket will in that way cool before it is time for the next laser pulse in this pocket.

Figure 2:
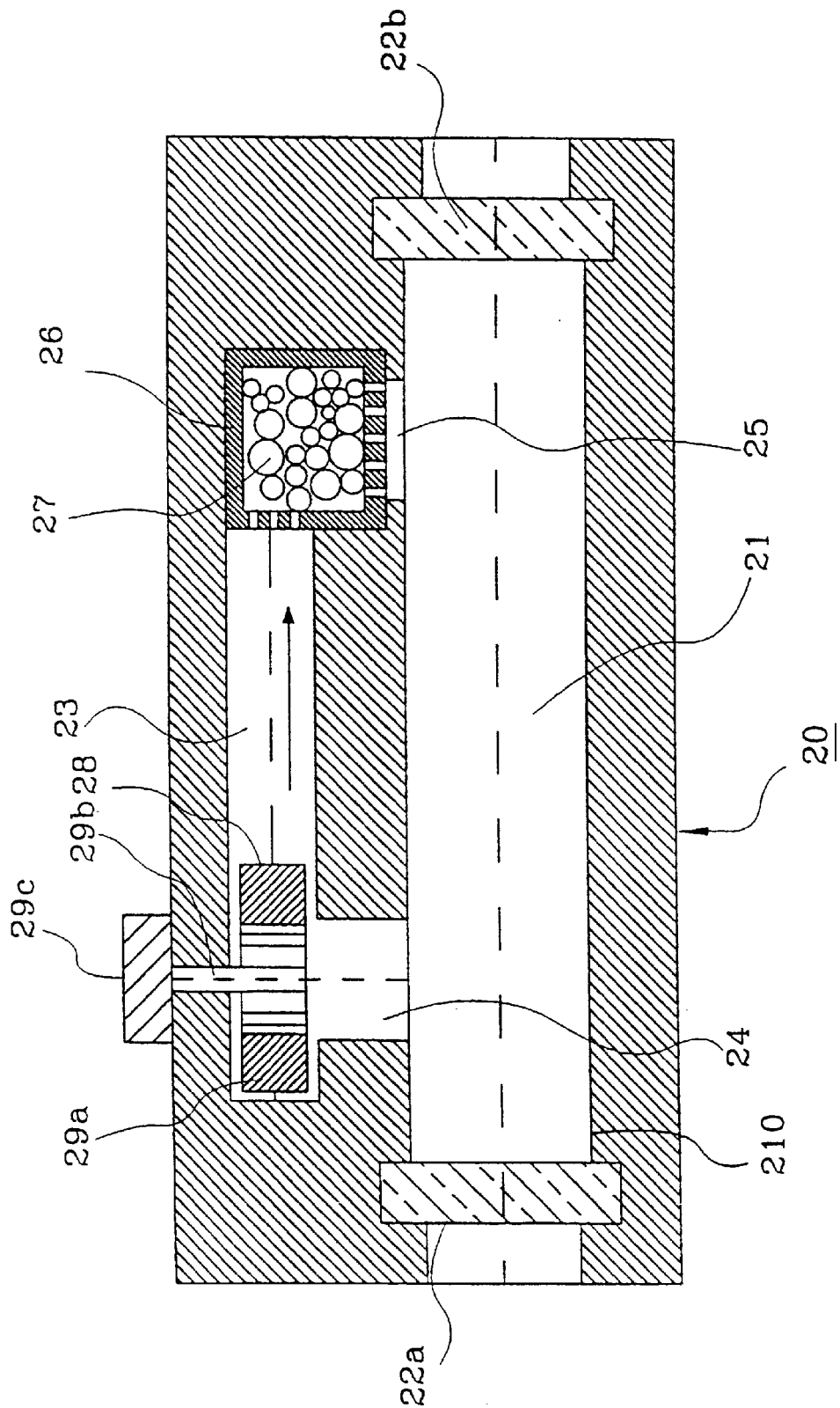
FIG. 2 shows in a cross-sectional view a second embodiment of a Raman cell according to the invention.

FIG. 2 shows an alternative embodiment of a Raman cell 20 according to the invention. The cavity 210 of the Raman cell 20 here includes an elongated interaction center 21 and a gas channel 23 which extends in parallel to the interaction center 21. The gas channel 23 has an inlet 24 and an outlet 25 close to the input window 22a and the output window 22b of the Raman cell. The gas is driven by means of a compressor wheel 28 to move around through the interaction center 21 and the gas channel 23. The compressor wheel 28 includes a rotating wheel 29a which is attached to a rotating shaft 29b, the shaft 29b being attached to the upper wall of the gas channel 23 above the inlet 24 thereof. The rotating wheel 29a is driven by a motor 29c. The direction of the movement of gas resulting thereby is in the figure indicated by an arrow.

At the outlet 25 of the gas channel 23 a recess in the channel is arranged in which a trap 26 is arranged which is filled with calcium granules 27. All gas that passes through the inlet 24 of the gas channel 23 also passes through the trap 26. The trap 26 is a perforated container which is permeable to the gas but the openings of which have a smaller hole diameter than the diameter of the calcium granules 27.

Figure 3:
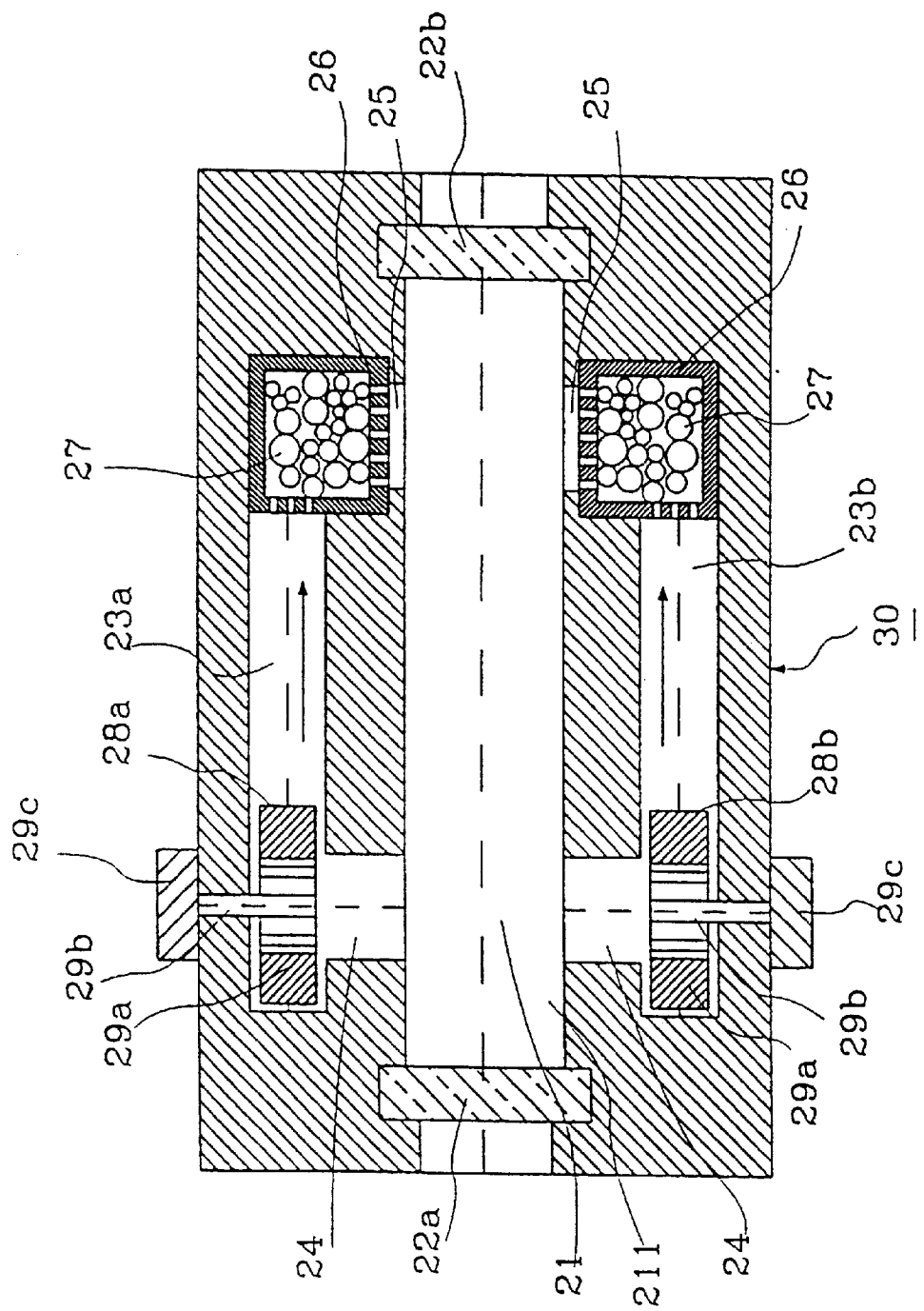
FIG. 3 shows in a cross-sectional view a third embodiment of a Raman cell according to the invention.

Another variant of the embodiment according to the above is shown in FIG. 3. A Raman cell 30 has a cavity 211 which includes in interaction center 21 and two mirrored gas channels 23a and 23b. The respective gas channel 23a and 23b comprises each a trap 26a and 26b respectively and each a compressor wheel 28a and 28b, respectively. The remaining reference numerals in FIG. 3 are the same as in FIG. 2.

Figure 4:
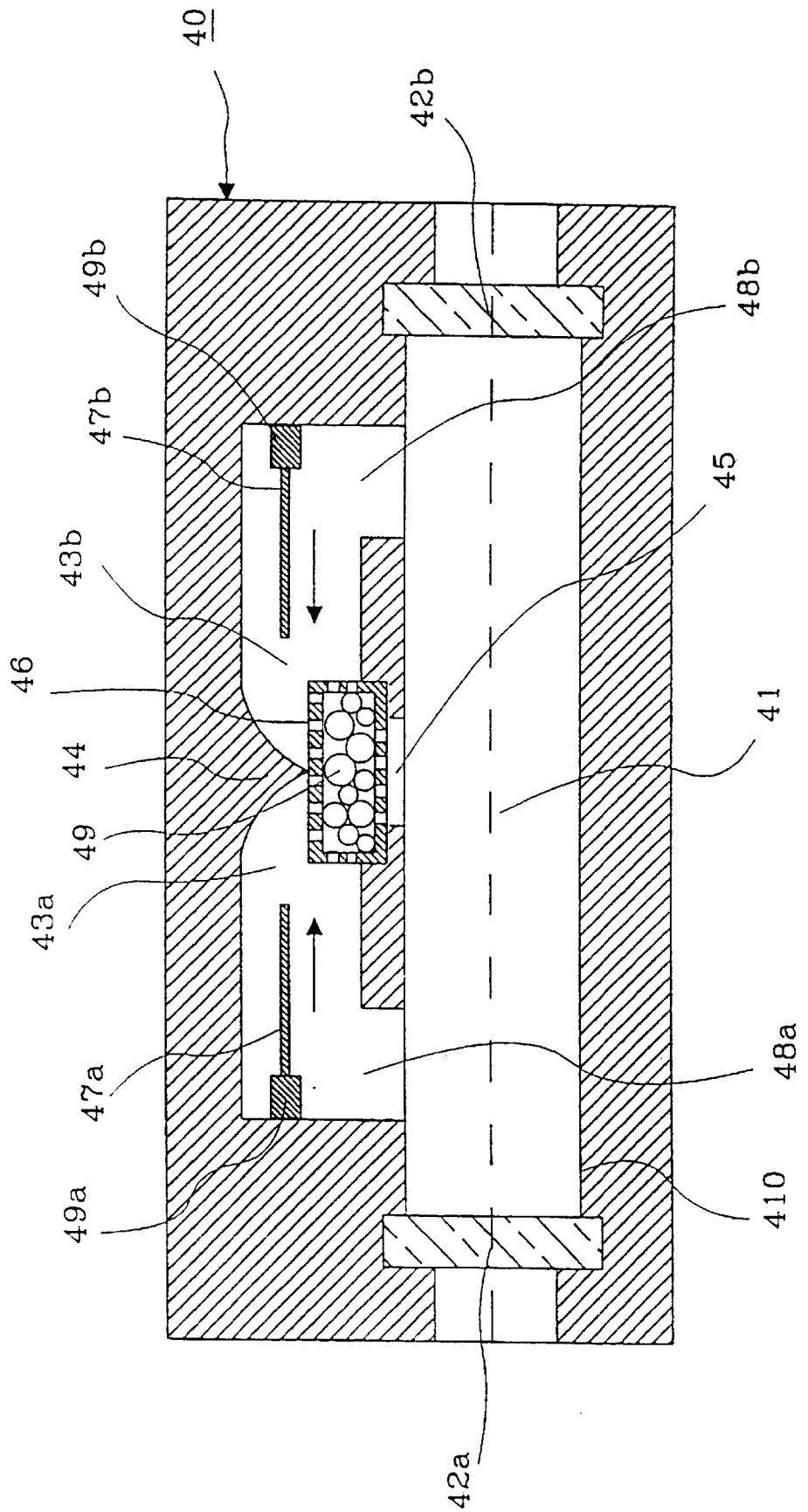
FIG. 4 shows in a cross-sectional view a fourth embodiment of a Raman cell according to the invention.

Another embodiment of the Raman cell is shown in FIG. 4. A Raman cell 40 comprises a cavity 410, which includes an interaction center 41 and two gas channels 43a and 43b, which are separated by a wall 44. The two gas channels 43a and 43b have each an inlet 48a and 48b, respectively, from the interaction center 41 close to the input and output windows 42a and 42b of the cell. The outlet 45 of the channels is common through an opening in the center of the interaction center 41. In the outlet 45 a trap 46 is placed that is filled with calcium grains 49, according to the above. In the respective channel 43a and 43b at the respective inlet 48a and 48b a respective blade 47a and 47b is attached. The blades 47a and 47b each perform a vibrating movement by means of an individual piezoelectric crystal 49a and 49b, respectively, whereby the gas in the interaction center 41 is driven in two opposite whirls through each of the gas channels 43a and 43b. The direction of the movement of the gas is indicated by the arrows drawn in the figure. The gas which passes through the respective gas channel 43a and 43b passes through the trap 46 in its way out into the interaction center 41, the methyl radicals reacting then with the absorbing material according to the above.

The design of a Raman cell including an absorbing material according to the invention is not limited to the embodiments described. The aforementioned method of obtaining a gas exchange in the interaction center, by means of a rotatable, divided cylinder, can e.g. also be used. The absorbing material can in that case be enclosed in a trap in each pocket. The design of the trap can also be made in different ways. The important point for the invention is that the gas is made to come in contact with the absorbing material. It is e.g. conceivable to use very small grains placed in a filter trap.

Tests have been made with the Raman cell designed according to the embodiment illustrated in FIG. 2, having the trap 26 filled with calcium grains. The trap 26 had a cylinder shape having a diameter of 10 mm and a height of 15 mm. The trap was filled with about 1.5 g calcium grains of dimensions 2 to 6 mm. The length of the Raman cell 20 was 200 mm and the height and width thereof were 25 mm. The output energy of the lasing Raman cell 20 was at the start of the test 25 mJ and the pulse length thereof was 18 ns. The pumped laser, corresponding to the laser 19 in FIG. 1, was a ND:YAG-laser having an output energy of 85 mJ and a pulse length of 20 ns. The pumped laser fired 10 shots per second (10 Hz) towards the Raman cell 20. The test continued until 5 million shots had been fired.

Figure 5:
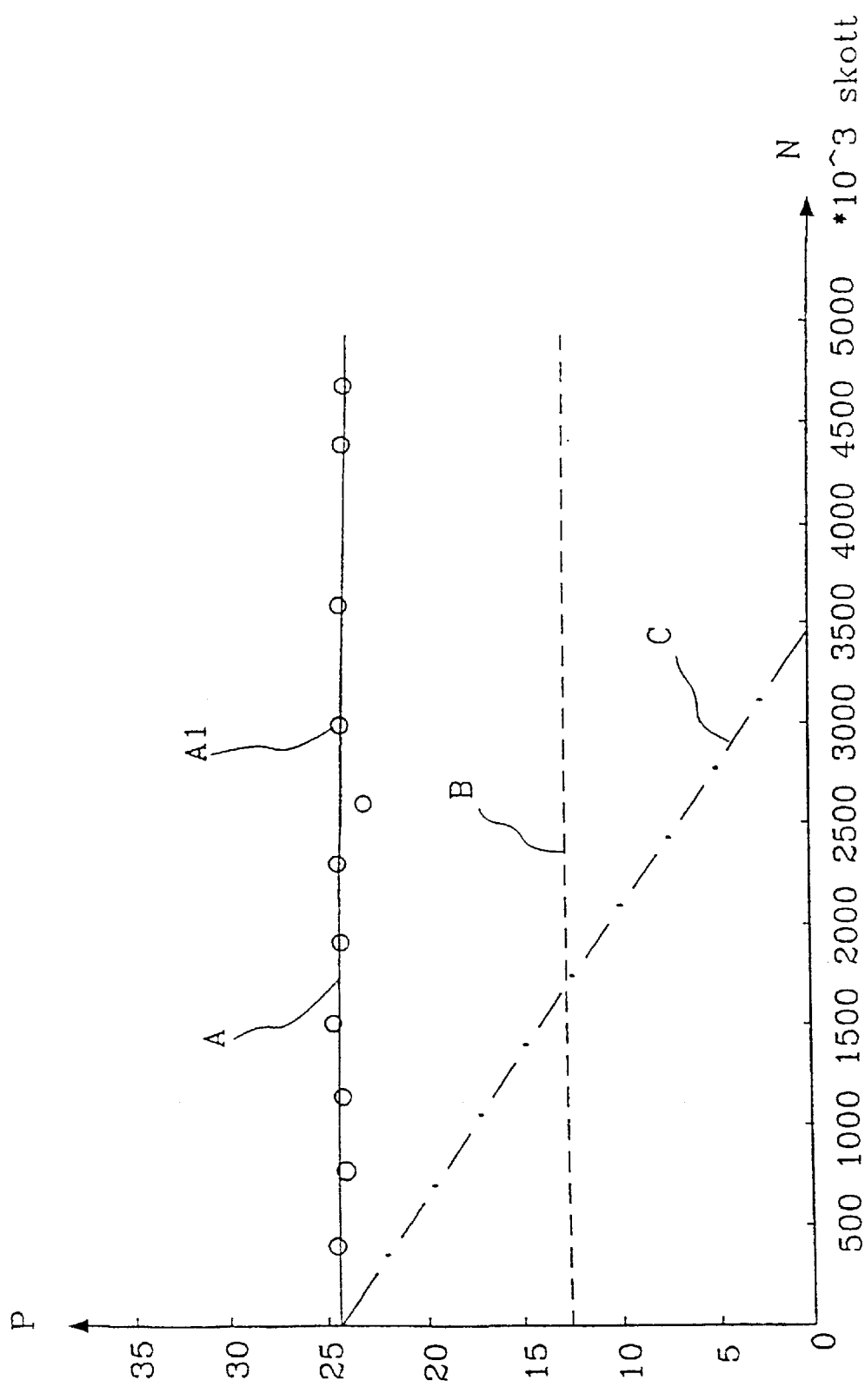
FIG. 5 shows a diagram comprising results from tests made according to the method by means of the invention.

In FIG. 5 the result of the test is shown in a diagram illustrating the output energy P of the Raman cell as a function of the number N of fired shots. The solid line A shows the output energy of the Raman cell 20 in the case where the methane gas passes through the calcium trap 26 according to the invention. The circles A1 at the line A has a size showing the standard deviation of the measurement results. A dashed line B shows a level which corresponds to a power reduction of 3 dB, compared to the output energy of the Raman cell at the start of the test, below which level the lifetime of the Raman cell can be considered to be ended. A line C of dots and dashes illustrates measurement results for a conventional Raman cell which does not use the invention.

It is clearly seen in the graph that the Raman cell according to the invention has a considerably longer lifetime than the conventional Raman cell. The lifetime of the conventional Raman cell is in the test about 1.7 million shots and at this time the output energy of the Raman cell according to the invention has been slightly reduced. The result from the tests clearly demonstrate that the desired effect has been obtained by the invention and that the increase of the lifetime of the Raman cell 20 from the tests can be estimated to a factor of 25 to 30.

What is claimed is:

1. A method for preventing formation of deposits on inner sides of windows in a Raman cell filled with a gaseous Raman active medium comprising methane that is decomposed into highly reactive methyl radicals when exposed to pumped high power laser radiation, the method comprising:

introducing into the Raman cell an absorbing material including at least one member selected from the group consisting of alkali metals and alkaline-earth metals; and making the generated methyl radicals to come in contact with the absorbing material so that the methyl radicals react with the absorbing material, thereby preventing formation of deposits on inner sides of windows in the Raman cell.

2. The method according to claim 1, wherein the absorbing material is an alkali metal.

3. The method according to claim 1, wherein the absorbing material is an alkaline-earth metal.

4. The method according to claim 1, wherein the reaction between the absorbing material and the methyl radicals takes place at substantially the same temperature as exists in the Raman cell.

5. The method according to claim 1, wherein the absorbing material is calcium.

6. The method according to claim 1, wherein the absorbing material is barium.

7. The method according to claim 1, wherein the absorbing material is strontium.

8. The method according to claim 1, wherein the absorbing material is lithium.

9. The method according to claim 1, wherein the absorbing material is potassium.

10. A Raman cell, comprising:

a cavity having an input window and an output window, the cavity being filled with a gaseous Raman active medium comprising methane, the active medium being decomposed into highly reactive methyl radicals when exposed to laser radiation having a high power; and an absorbing material arranged in the cavity, the absorbing material comprising at least one member selected from the group consisting of alkaline-earth metals and alkali metals, wherein the material chemically reacts with the methyl radicals, thereby preventing formation of deposits on inner sides of windows in the Raman cell.

11. The Raman cell according to claim 10, wherein the absorbing material is an alkali metal.

12. The Raman cell according to claim 10, wherein the absorbing material is an alkaline-earth metal.

13. The Raman cell according to claim 10, wherein the reaction between the absorbing material and the methyl radicals occurs at substantially the same temperature as exists in the Raman cell.

14. The Raman cell according to claim 10, wherein absorbing material is contained within a container arranged within the cavity, the container being permeable to the Raman active medium including the methyl radicals but impermeable to the absorbing material.

15. The Raman cell according to claim 10, wherein the absorbing material is calcium.

16. The Raman cell according to claim 10, wherein the absorbing material is barium.

17. The Raman cell according to claim 10, wherein the absorbing material is strontium.

18. The Raman cell according to claim 10, wherein the absorbing material is lithium.

19. The Raman cell according to claim 10, wherein the absorbing material is potassium.

20. The Raman cell according to claim 10, wherein the absorbing material is granular.

21. The Raman cell according to claim 10, wherein the Raman cell comprises at least one driving device for producing movement of the gaseous medium.

22. The Raman cell according to claim 21, wherein the driving device is a compressor wheel.

23. The Raman cell according to claim 21, wherein the driving device is a vibrating blade.

24. The Raman cell according to claim 21, wherein the driving device is a rotatable cylinder-like device having radial wings including separate pockets located therebetween, the driving device extending in a longitudinal direction of the Raman cell, the pockets each comprising a trap comprising the absorbing material.

25. The Raman cell according to claim 10, wherein the cavity comprises an elongated interaction center extending between the input window and the output window, the laser beam passing through the interaction center, the cavity further comprising at least one gas channel that extends along the interaction center and has an inlet from and an outlet to the interaction center, wherein the absorbing material is contained within a perforated container, the container being located in the outlet of the gas channel, the absorbing material having a granular shape, the container being permeable to the gaseous medium and the perforations having a smaller diameter than a granular size of the absorbing material, the Raman cell further comprising a driving device arranged in the inlet of the gas channel.

26. The Raman cell according to claim 25, wherein the cavity of the Raman cell comprises a single gas channel.

27. The Raman cell according to claim 25, wherein the cavity of the Raman cell comprises two gas channels.

* * * * *